M. H. CONKLIN & D. J. KIRTLAND.
SPRING WHEEL.
APPLICATION FILED MAY 21, 1913.
1,114,583.
Patented Oct. 20, 1914.
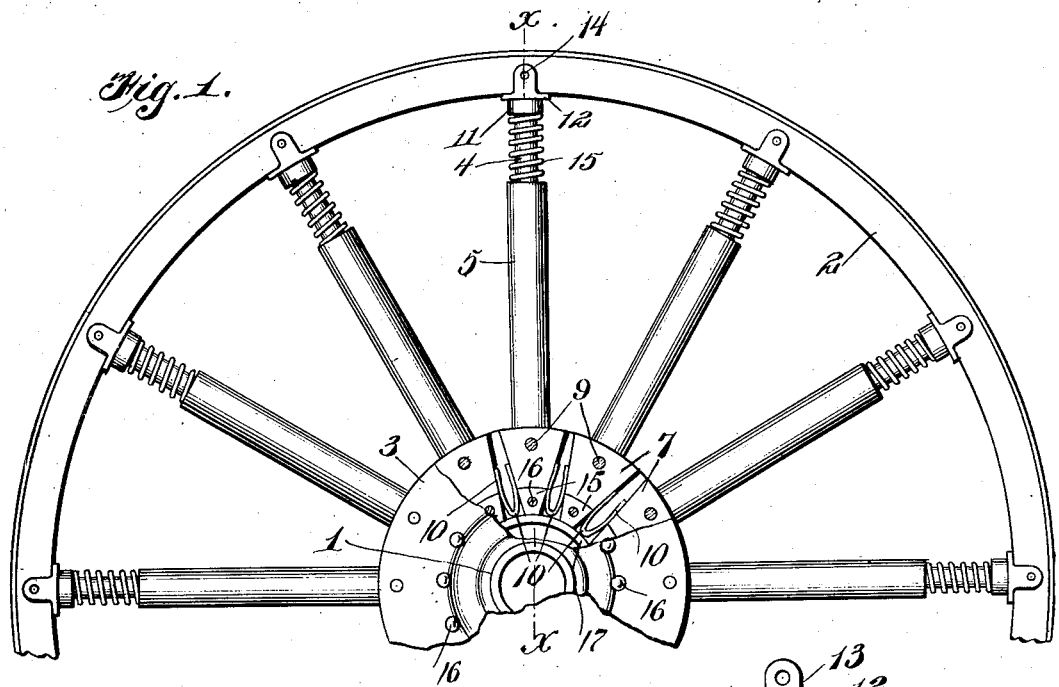
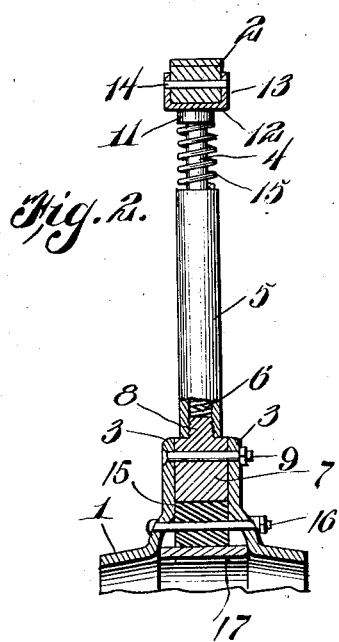
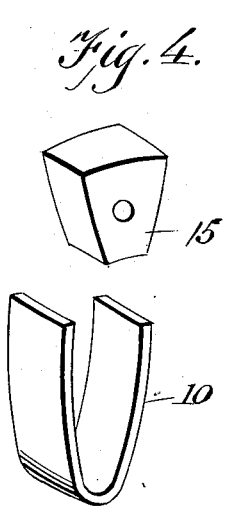
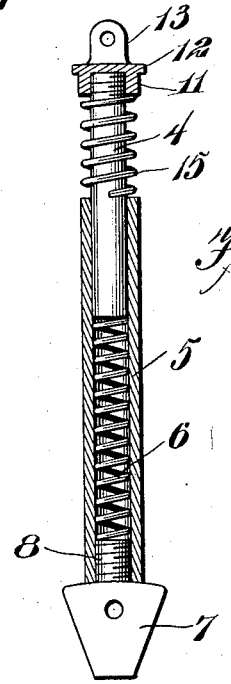
Witnesses
Louis R. Heinrichs
U. B. Hillyard
Inventors
M. H. Conklin
D. J. Kirtland
By Victor J. Evans
Attorney

UNITED STATES PATENT OFFICE.

MELVIN H. CONKLIN AND DANIEL J. KIRTLAND, OF ANTONITO, COLORADO.

SPRING-WHEEL.

1,114,533.  Specification of Letters Patent.  Patented Oct. 20, 1914.

Application filed May 21, 1913. Serial No. 769,049.

*To all whom it may concern:*

Be it known that we, MELVIN H. CONKLIN and DANIEL J. KIRTLAND, citizens of the United States, residing at Antonito, in the county of Conejos and State of Colorado, have invented new and useful Improvements in Spring-Wheels, of which the following is a specification.

The invention relates to the type of vehicle wheels embodying telescoping spokes and interposed cushioning devices such as helical springs.

The invention provides a wheel of the variety hereinbefore mentioned which admits of the parts being readily assembled or taken apart when it becomes necessary to replace any element or for other cause.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of part of a vehicle wheel embodying the invention, showing a portion in section to bring out more clearly the relation of the component parts. Fig. 2 is a transverse section on the line $x$—$x$ of Fig. 1. Fig. 3 is an enlarged sectional view of one of the spokes and clips whereby the spokes are attached to the rim of the wheel. Fig. 4 is a detail view of one of the spoke cushioning blocks. Fig. 5 is a detail perspective view of one of the U shaped springs.

Corresponding and like parts are referred to in the following description, and indicated in all the views of the drawing, by the same reference characters.

The wheel embodies a hub 1, rim 2, telescoping spokes having their members connected to respectively the rim and hub and cushioning devices such as helical springs of the expansible type. The hub 1 comprises like sections each having an outer flange 3 at its inner end, said flanges receiving the inner ends of the spokes between them when the several parts are assembled. The spokes are of like formation, each embodying an outer member 4 and an inner member 5, said members having a telescoping arrangement. The inner member 5 is preferably tubular and receives the outer member 4 which is arranged to telescope therein, said tubular member also receiving a helical spring 6 which normally exerts an outward pressure upon the inner end of the member 4. A wedge shaped head 7 is detachably connected to the inner end of the spoke member 5 and its sides are preferably parallel and touch the inner faces of the flanges 3, thereby preventing any lateral play of the spokes, but admitting of such spokes having a limited oscillatory movement in the plane of the wheel. The head 7 has a projection 8 which enters the inner end of the spoke member 5 and is preferably connected thereto by means of a screwthread joint. Bolts or fastenings 9 pass through registering openings formed in the flanges 3 and head 7 and serve to connect the several parts. When the spokes are in position V shaped spaces are formed between the opposing edges of adjacent heads 7 and these spaces receive U shaped springs 10 or like yieldable means which will admit of the spokes having a limited movement in the plane of the wheel so as to compensate for shock and vibration. The outer member 4 is formed with a socket 11 which is secured to a projection 12 of a clip 13, the latter being constructed to embrace opposite sides of the rim 2 to which it is attached by means of a bolt or fastening 14. The clip 13 and spoke member 4 are preferably connected by means of a screwthread joint. A helical spring 15 surrounds the outer portion of the member 4 and is interposed between the socket 11 thereof and the outer end of the spoke member 5. The tension of the cushioning springs 6 and 15 is such as to sustain the load imposed upon the rim of the wheel and to admit of such rim yielding to absorb vibration and shock. The clip 13 is pivotally connected to the rim by means of the fastening 14, thereby admitting of the part having a limited play.

It will be understood from the foregoing, taken in connection with the accompanying drawing, that the invention provides a wheel which admits of the parts being readily assembled or of any spoke being removed without disturbing the remainder should it become necessary to replace any part such as a disabled spring or spoke member.

From the foregoing description, taken in connection with the accompanying drawing, the advantages of the construction and of the method of operation will be readily apparent to those skilled in the art to which the invention appertains; and while we have described the principle of operation of the invention, together with the device which we now consider to be the best embodiment thereof, we desire to have it understood that the device shown is merely illustrative, and that such changes may be made when desired as are within the scope of the claim appended hereto.

Rubber blocks 15 are secured between the sections of the hub by means of bolts 16, the latter passing through such blocks and the flanges of the hub section. The rubber blocks 15 form cushioning means for the spokes and are located at the inner ends of the heads 7. A ring 17 is arranged between the inner ends of the hub sections and touches the inner ends of the rubber blocks or spoke cushioning means 15. This ring 17 also engages the inner ends of the U shaped springs 10 and prevents inward movement thereof.

Having thus described the invention what is claimed as new, is:—

A spring wheel comprising a sectional hub, each of the hub sections having an outer flange at its inner end, a rim, telescoping spokes between the rim and hub, each of such spokes comprising an inner tubular member and an outer member telescoping within the tubular member and provided at its outer end with a threaded socket, a clip pivotally connected to the rim and having a threaded projection fitted to said socket, wedge shaped heads arranged between the flanges of the hub sections with V shaped spaces between the opposing edges of adjacent heads, U shaped springs in the spaces between the wedge shaped heads, fastenings connecting the flanges of the hub sections and the wedge shaped heads, the latter having threaded projections to receive the tubular spoke members, helical springs located within the tubular spoke members and interposed between the outer spoke members and the wedge shaped heads, and other helical springs surrounding the outer spoke members and interposed between the sockets thereof and the outer ends of the tubular spoke members.

In testimony whereof we affix our signatures in presence of two witnesses.

MELVIN H. CONKLIN.
DANIEL J. KIRTLAND.

Witnesses:
  J. D. FRAZEY,
  NICK T. RODRIQUEZ.